United States Patent Office 3,457,183
Patented July 22, 1969

3,457,183
LASER GLASSES HAVING A RELATIVELY LOW THERMAL EXPANSION
Haynes A. Lee, Jr., Sylvania, and Charles F. Rapp, Toledo, Ohio, assignors to Owens-Illinois, Inc., a corporation of Ohio
No Drawing. Filed Apr. 28, 1966, Ser. No. 545,864
Int. Cl. C09k 1/04
U.S. Cl. 252—301.4   13 Claims The present invention relates to novel glass compositions exhibiting relatively low coefficients of thermal expansion and, more particularly, to novel glass compositions that exhibit laser action under proper conditions and which possess relatively high thermal shock resistance and less thermal distortion is encountered with the glasses of the present invention as compared with glasses used as the host material for laseable substances in the past.

The term "laser" is an acronym for "light amplification by stimulated emission of radiation." A laser is a device capable of amplifying or generating coherent light. Lasers emit generally monochromatic optical radiation in the form of a narrowly plane wave with a beam angle diversion theoretically limited by diffraction effects. When a material exhibits stimulated emission of radiation under a particular set of conditions it is said to "lase."

Lasers can take various forms and the specific shape or structure of the laser and the apparatus in which it is used does not constitute the critical feature of the present invention. The laser may be a small cylinder or rod, the end faces of which are plane and which may have an extremely high degree of parallel accuracy. Also the end faces may be cut so as to be totally internally reflecting or cut to a Brewster angle to decrease the reflection loss. In certain lasers one end of the rod may be completely reflecting and the other of the end faces partially reflecting. It will be apparent that the configuration and characteristics of the laser body itself can vary widely. In operation, the laser body is irradiated by suitable means such as a flash lamp operating for a few milliseconds at a time with an input energy of normally greater than about 100 joules.

In many instances involving actual operation of the laser most of the input energy is dissipated as heat and only a small portion of the energy emitted by the source of radiation is absorbed by the laser material. This energy provides the excitation for the laser. The laser cylinder funnels the energy which is absorbed over a broad spectral region into a narrow emission line whose wave length is a function of the laseable substances contained in the laser host. Further reference concerning the nature of lasers, their structure and various properties as well as the theoretical discussion of lasers will be found in the book entitled, Lasers, Generation of Light by Stimulated Emission, by Bela A. Lengyel, John Wiley and Sons, Inc., New York, 1962.

Because of their unique properties, lasers may be used for a wide variety of purposes including scientific experimentation, use of light as a carrier for intelligence and use of light for concentrations of power for technological and military purposes. For purposes of illustration, it has been estimated that in the field of communications and under the proper controls, an extremely important information carrier could be achieved and under ideal conditions a single laser could replace all of the information carrying systems between East and West coasts of the United States. In addition, because of its extremely narrow beam a laser suitable for point-to-point communications in space where atmospheric attenuation does not interfere with the propagation of radiation. Other applications for lasers include surgical and biological applications, control over chemical reactions, and various other purposes. Recently lasers have achieved wide attention and it is generally acknowledged that they represent an extremely valuable tool for a great many purposes.

One of the disadvantages of previously known lasers is the fact that the large energy inputs over a small amount of time required for laser action produce great amounts of heat. Most laser hosts heretofore have exhibited severe thermal distortion. Conventional materials utilized as the host for laseable substances have extremely poor characteristics in this respect. Any materials possessing relatively large coefficients of thermal expansion would be undesirable for lasers in many applications. The enormous amounts of heat which are absorbed by the host tend to cause considerable thermal distortions and changes in the optical path of the host.

Applications of the laser require a very high energy laser beam. This can only be produced by pumping the laser rod with the very intense light. This pumping generates enormous amounts of heat in the laser rod which can cause the rod to crack.

Accordingly, it is the object of this present invention to diminish the disadvantages and drawbacks associated with prior laser host compositions by providing a novel composition having relatively low thermal expansion which can endure much higher pumping intensities.

It is a further object of the present invention to provide low expansion laser host compositions which reduce the amount of dimensional change which occurs when subjected to large amounts of heat and which result in a lesser amount of thermal distortion.

It is a further object of the present invention to provide laseable glass compositions exhibiting desirable properties and characteristics.

It is a further object of the present invention to provide methods for making lasers exhibiting relatively low thermal expansion and which do not undergo as much thermal distortion as do the previously used glass compositions.

In attaining the above objects one feature of the present invention resides in a novel glass composition containing neodymium oxide as the laseable substance and a silicate glass containing relatively large amounts of barium oxide.

A further feature of the present invention resides in novel laseable compositions wherein the glass host is selected from the composition of the silicate system containing relatively large amounts of barium oxide and also containing zirconium oxide.

A still further feature of the present invention resides in a relatively low expansion laseable glass composition formed of th silicate system containing a relatively large amount of barium oxide and zirconium oxide and as the laseable substance, neodymium oxide.

The above as well as other objects, features and advantages of the present invention will become apparent from the following detailed description thereof.

Many applications of the laser require a very high energy laser beam. This high energy laser beam can only be produced by subjecting the laser rod to a very high and intense light. This is referred to as pumping the laser rod and generates large quantities of heat in the laser rod which can cause the rod to crack. According to the present invention the novel glass host compositions have a much lower coefficient of linear thermal expansion than the glass host compositions now on the market which are about 95 to $110 \times 10^{-7}/°$ C. or more and will endure a much higher pumping intensity and therefore will exhibit increased service life because of the enhanced properties and characteristics of the resulting laser.

According to the present invention novel glass laser compositions having relatively low coefficient of linear thermal expansion are provided, such coefficients being generally about $65 \times 10^{-7}/°$ C. and under. The most desirable glasses of this invention range from about $50 \times 10^{-7}/°$ C. to $65 \times 10^{-7}/°$ C. The glass host material is selected from the silica-zirconia-baria system. The lasers are prepared by dispersing in the glass as the laseable substance a sufficient amount of neodymium oxide. The amount of neodymium oxide incorporated into the laser host glass is not narrowly critical and generally will be in the range of about 1 to 4% by weight or even as high as about 8% by weight of the total composition.

Included among the suitable host compositions for the purposes of the present invention are glasses selected from the silica-zirconia-baria system containing the following ingredients in percent by weight based on the total composition:

| Component: | Percent range |
|---|---|
| $SiO_2$ | 40–65 |
| $Al_2O_3$ | 0–5 |
| $Li_2O$ | 0–0.5 |
| $Na_2O$ | 0–2.3 |
| $K_2O$ | 0–7 |
| $MgO$ | 0–2 |
| $CaO$ | 0–2 |
| $SrO$ | 0–7.5 |
| $BaO$ | 10.5–40 |
| $ZrO_2$ | 7–10 |
| $Ce_2O_3$ | 0–1 |
| $Sb_2O_5$ | 0–1 | in which $(3Li_2O+2Na_2O+K_2O)$ must be at least 5.5 weight percent and in which the total RO content (where R is Ca, Mg, Sr, or Ba) must be least 15 weight percent. As used herein, the term $(3Li_2O+2Na_2O+K_2O)$ means 3 times the weight percent of $Li_2O+2$ times the weight percent of the $Na_2O+$the weight percent of $K_2O$.

The neodymium oxide is then added to the host material in varying amounts, for example, 1 to 8% by weight.

In a more preferred embodiment of the present invention suitable host compositions are glasses containing the following ingredients in the indicated amounts based on the weight of the total composition:

| Component: | Weight percent |
|---|---|
| $SiO_2$ | 46.5–63.5 |
| $Al_2O_3$ | 0–3 |
| $Li_2O$ | 0–2 |
| $Na_2O$ | 0–2.2 |
| $K_2O$ | 0–6.5 |
| $SrO$ | 0–7.5 |
| $BaO$ | 10.5–38 |
| $ZrO_2$ | 7–9 |
| $Ce_2O_3$ | 0–0.5 |
| $Sb_2O_5$ | 0–0.5 | in which $(3Li_2O+2Na_2O+K_2O)$ must be at least 5.5 weight precent and in which the total RO content (where R is Ca, Mg, Sr, or Ba) must be at least 15 weight percent.

Further examples of suitable glass compositons for purposes of the present invention contain the following components in the indicated amounts based on the total weight of the composition:

| Component: | Weight percent |
|---|---|
| $SiO_2$ | 46.5–63.5 |
| $Al_2O_3$ | 1–3 |
| $Li_2O$ | 0–1.85 |
| $Na_2O$ | 0–2.2 |
| $K_2O$ | 0–6.5 |
| $BaO$ | 20–38 |
| $ZrO_2$ | 7–9 |
| $Ce_2O_3$ | 0–0.5 |
| $Sb_2O_5$ | 0–0.5 | in which $(3Li_2O+2Na_2O+K_2O)$ must be at least 5.5 weight precent and in which the total RO content (where R is Ca, Mg, Sr, or Ba) must be at least 15 weight percent.

The raw materials which form the components of the glass compositions described above can be in various forms such as oxides, carbonates and the like. A melt is prepared by mixing the components together and dispersing the neodymium oxide therein. Minor amounts of other ingredients may also be present in the melt provided that their presence does not adversely affect the final composition or the desired end properties. It is important that the iron content be kept very low and neodymium laser glass as FeO has an absorption band that overlaps the lasing wave lengths of $1.06\mu$. The level of iron in the glasses prepared in the present invention should not exceed about 100 p.p.m. $Fe_2O_3$. Generally, it is preferable to keep the $Fe_2O_3$ content below 50 p.p.m.

The following examples illustrate the present invention and are not intended to be limiting thereof in any way.

EXAMPLE I

| Component: | Weight percent |
|---|---|
| $SiO_2$ | 63.25 |
| $Al_2O_3$ | 2.84 |
| $Na_2O$ | 2.16 |
| $K_2O$ | 3.28 |
| $SrO$ | 7.21 |
| $BaO$ | 10.68 |
| $ZrO_2$ | 8.58 |
| $Nd_2O_3$ | 2.00 |

The foregoing composition was melted from reagent grade raw materials to form an object of high optical quality. Rods of about ½ inch diameter by 4 inches long were prepared from the melt. The ends of the rod were polished to a close tolerance and the rod was then placed in the laser system and operated satisfactorily.

EXAMPLE II

| Component: | Weight percent |
|---|---|
| $SiO_2$ | 61.07 |
| $Al_2O_3$ | 2.74 |
| $Na_2O$ | 2.09 |
| $K_2O$ | 3.17 |
| $BaO$ | 20.64 |
| $ZrO_2$ | 8.29 |
| $Nd_2O_3$ | 2.00 |

Reagent grade materials were used to prepare a melt having the composition set forth above. Rods were prepared from the melt and tested and found to lase satisfactorily.

EXAMPLE III

| Component: | Weight percent |
|---|---|
| $SiO_2$ | 60.42 |
| $Al_2O_3$ | 2.72 |
| $K_2O$ | 6.26 |
| $BaO$ | 20.40 |
| $ZrO_2$ | 8.20 |
| $Nd_2O_3$ | 2.00 |

A melt was prepared having the above composition using reagent grade raw materials. The melt was observed to have high optical quality. After annealing rods were prepared from the melt and the rods had a dimension of about ½ inch in diameter by 4 inches long. The rods were prepared in a laser system and tested satisfactorily.

EXAMPLES IV THROUGH VII

The following examples show various compositions which were prepared in accordance with the procedure described in the foregoing examples. Melts were prepared having the compositions indicated and then rods were prepared and tested and found to be satisfactory.

| Component | IV | V | VI | VII |
|---|---|---|---|---|
| $SiO_2$ | 46.9 | 47.3 | 48.3 | 47.8 |
| $Al_2O_3$ | 2.4 | 2.5 | 2.5 | 2.5 |
| $Li_2O$ |  | 0.9 | 1.85 | 1.85 |
| $Na_2O$ | 1.9 |  |  |  |
| $K_2O$ | 2.8 | 2.8 |  |  |
| BaO | 36.6 | 37.0 | 37.7 | 37.7 |
| $ZrO_2$ | 7.4 | 7.4 | 7.6 | 7.6 |
| $Nd_2O_3$ | 2.0 | 2.0 | 2.0 | 2.0 |
| $Ce_2O_3$ |  |  |  | 0.5 |

EXAMPLE VIII

| Component: | Weight percent |
|---|---|
| $SiO_2$ | 50.3 |
| $Li_2O$ | 1.85 |
| BaO | 37.7 |
| $ZrO_2$ | 7.6 |
| $Nd_2O_3$ | 2.0 |
| $Ce_2O_3$ | 0.5 |
| $Sb_2O_5$ | 0.5 |

A melt was prepared from reagent grade materials to form a composition as indicated above. Rods were prepared and tested in a laser apparatus and were found to endure a high pumping intensity.

EXAMPLE IX

| Component: | Weight percent |
|---|---|
| $SiO_2$ | 47.3 |
| $Al_2O_3$ | 2.5 |
| $Li_2O$ | 1.85 |
| BaO | 37.7 |
| $ZrO_2$ | 7.6 |
| $Nd_2O_3$ | 2.0 |
| $Ce_2O_3$ | 1.0 |

The above composition was prepared using the same procedure as followed in the foregoing examples. A laser rod was prepared and found to have low thermal expansion and exhibited excellent performance in a laser apparatus.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A relatively low expansion glass laser consisting essentially of the following composition in parts by weight:

| Component: | Weight percent |
|---|---|
| $SiO_2$ | 40–65 |
| $Al_2O_3$ | 0–5 |
| $Li_2O$ | 0–5.5 |
| $Na_2O$ | 0–2.3 |
| $K_2O$ | 0–7 |
| MgO | 0–2 |
| CaO | 0–2 |
| SrO | 0–7.5 |
| BaO | 10.5–40 |
| $ZrO_2$ | 7–10 |
| $Ce_2O_3$ | 0–1 |
| $Sb_2O_5$ | 0–1 |
| $Nd_2O_3$ | 1–8 | in which ($3Li_2O+2Na_2O+K_2O$) must be at least 5.5 weight percent, and the total RO content must be at least 15 weight percent, in which R is Ca, Mg, Sr, or Ba.

2. A transparent relatively low expansion laser as defined in claim 1 consisting essentially of the following components in the indicated amounts by weight of the total composition:

| Component: | Weight percent |
|---|---|
| $SiO_2$ | 46.5–63.5 |
| $Al_2O_3$ | 0–3 |
| $Li_2O$ | 0–2 |
| $Na_2O$ | 0–2.2 |
| $K_2O$ | 0–6.5 |
| SrO | 0–7.5 |
| BaO | 10.5–38 |
| $ZrO_2$ | 7–9 |
| $Ce_2O_3$ | 0–0.5 |
| $Sb_2O_5$ | 0–0.5 |
| $Nd_2O_3$ | 1–4 | in which ($3Li_2O+2Na_2O+K_2O$) must be at least 5.5 weight percent, and the total RO content must be at least 15 weight percent, in which R is Ca, Mg, Sr, or Ba.

3. A transparent low expansion glass laser as defined in claim 1 consisting essentially of the following composition in parts by weight:

| Component: | Weight percent |
|---|---|
| $SiO_2$ | 46.5–63.5 |
| $Al_2O_3$ | 1–3 |
| $Li_2O$ | 0–1.8 |
| $Na_2O$ | 0–2.2 |
| $K_2O$ | 0–6.5 |
| BaO | 20–38 |
| $ZrO_2$ | 7–9 |
| $Ce_2O_3$ | 0–0.5 |
| $Sb_2O_5$ | 0–0.5 |
| $Nd_2O_3$ | 1–4 | in which ($3Li_2O+2Na_2O+K_2O$) must be at least 5.5 weight percent, and the total RO content must be at least 15 weight percent, in which R is Ca, Mg, Sr, or Ba.

4. A transparent relatively low expansion glass laser as defined in claim 1 consisting essentially of the following composition in parts by weight:

| Component: | Weight percent |
|---|---|
| $SiO_2$ | 63.25 |
| $Al_2O_3$ | 2.84 |
| $Na_2O$ | 2.16 |
| $K_2O$ | 3.28 |
| SrO | 7.21 |
| BaO | 10.68 |
| $ZrO_2$ | 8.58 |
| $Nd_2O_3$ | 2.00 |

5. A transparent relatively low expansion glass laser as defined in claim 1 consisting essentially of the following composition in parts by weight:

| Component: | Weight percent |
|---|---|
| $SiO_2$ | 61.07 |
| $Al_2O_3$ | 2.74 |
| $Na_2O$ | 2.09 |
| $K_2O$ | 3.17 |
| BaO | 20.64 |
| $ZrO_2$ | 8.29 |
| $Nd_2O_3$ | 2.00 |

6. A transparent relatively low expansion glass laser as defined in claim 1 consisting essentially of the following composition in parts by weight:

| Component: | Weight percent |
|---|---|
| $SiO_2$ | 60.42 |
| $Al_2O_3$ | 2.72 |
| $K_2O$ | 6.26 |
| BaO | 20.40 |
| $ZrO_2$ | 8.20 |
| $Nd_2O_3$ | 2.00 |

7. A transparent relatively low expansion glass laser as defined in claim 1 consisting essentially of the following composition in parts by weight:

| Component: | Weight percent |
|---|---|
| $SiO_2$ | 46.9 |
| $Al_2O_3$ | 2.4 |
| $Na_2O$ | 1.9 |
| $K_2O$ | 2.8 |
| $BaO$ | 36.6 |
| $ZrO_2$ | 7.4 |
| $Nd_2O_3$ | 2.0 |

8. A transparent relatively low expansion glass laser as defined in claim 1 consisting essentially of the following composition in parts by weight:

| Component: | Weight percent |
|---|---|
| $SiO_2$ | 47.3 |
| $Al_2O_3$ | 2.5 |
| $Li_2O$ | 0.9 |
| $K_2O$ | 2.8 |
| $BaO$ | 37.0 |
| $ZrO_2$ | 7.4 |
| $Nd_2O_3$ | 2.0 |

9. A transparent relatively low expansion glass laser as defined in claim 1 consisting essentially of the following composition in parts by weight:

| Component: | Weight percent |
|---|---|
| $SiO_2$ | 48.3 |
| $Al_2O_3$ | 2.5 |
| $Li_2O$ | 1.85 |
| $BaO$ | 37.7 |
| $ZrO_2$ | 7.6 |
| $Nd_2O_3$ | 2.0 |

10. A transparent relatively low expansion glass laser as defined in claim 1 consisting essentially of the following composition in parts by weight:

| Component: | Weight percent |
|---|---|
| $SiO_2$ | 47.8 |
| $Al_2O_3$ | 2.5 |
| $Li_2O$ | 1.85 |
| $BaO$ | 37.7 |
| $ZrO_2$ | 7.6 |
| $Nd_2O_3$ | 2.0 |
| $Ce_2O_3$ | 0.5 |

11. A transparent relatively low expansion glass laser as defined in claim 1 consisting essentially of the following composition in parts by weight:

| Component: | Weight percent |
|---|---|
| $SiO_2$ | 50.3 |
| $Li_2O$ | 1.85 |
| $BaO$ | 37.7 |
| $ZrO_2$ | 7.6 |
| $Nd_2O_3$ | 2.0 |
| $Ce_2O_3$ | 0.5 |
| $Sb_2O_5$ | 0.5 |

12. A transparent relatively low expansion glass laser as defined in claim 1 consisting essentially of the following composition in parts by weight:

| Component: | Weight percent |
|---|---|
| $SiO_2$ | 47.3 |
| $Al_2O_3$ | 2.5 |
| $Li_2O$ | 1.85 |
| $BaO$ | 37.7 |
| $ZrO_2$ | 7.6 |
| $Nd_2O_3$ | 2.0 |
| $Ce_2O_3$ | 1.0 |

13. In the method for making a laser, the improvement which comprises dispersing about 1 to about 8% by weight neodymium oxide, $Nd_2O_3$, in a transparent low expansion glass composition containing the following ingredients in the indicated weight percent range:

| Component: | Weight percent |
|---|---|
| $SiO_2$ | 40–65 |
| $Al_2O_3$ | 0–5 |
| $Li_2O$ | 0–5.5 |
| $Na_2O$ | 0–2.3 |
| $K_2O$ | 0–7 |
| $MgO$ | 0–2 |
| $CaO$ | 0–2 |
| $SrO$ | 0–7.5 |
| $BaO$ | 10.5–40 |
| $ZrO_2$ | 7–10 |
| $Ce_2O_3$ | 0–1 |
| $Sb_2O_5$ | 0–1 | in which ($3Li_2O+2Na_2O+K_2O$) must be at least 5.5 weight percent, and the total RO content must be at least 15 weight percent, in which R is Ca, Mg, Sr, or Ba.

References Cited

UNITED STATES PATENTS

| 3,208,009 | 9/1965 | Etzel et al. | 252—301.4 |
| 3,270,290 | | Maurer | 252—301.4 |
| 3,384,597 | | De Paolis | 252—301.4 |

FOREIGN PATENTS 1,015,057   12/1965   Great Britain.

TOBIAS E. LEVOW, Primary Examiner
R. D. EDMONDS, Assistant Examiner

U.S. Cl. X.R.

106—52

PO-1050
(5/69)

UNITED STATES PATENT OFFICE
CERTIFICATE OF CORRECTION

Patent No. 3,457,183            Dated July 22, 1969

Inventor(s) Haynes A. Lee, Jr. and Charles F. Rapp

It is certified that error appears in the above-identified patent and that said Letters Patent are hereby corrected as shown below:

Column 2, line 52, change "th" to --the--.  Column 3, line 1, change "havng" to --having--; line 22, change "0-0.5" to --0-5.5--; line 34, after "be" insert --at--; line 58, change "precent" to --percent--.  Column 4, line 2, change "precent" to --percent--.

SIGNED AND
SEALED

DEC 23 1969

(SEAL)
Attest:

Edward M. Fletcher, Jr.
Attesting Officer

WILLIAM E. SCHUYLER, JR.
Commissioner of Patents